United States Patent [19]
Jaworski et al.

[11] Patent Number: 5,795,092
[45] Date of Patent: Aug. 18, 1998

[54] INTERNALLY SEALED PIVOTAL JOINT ASSEMBLY

[75] Inventors: Kevin J. Jaworski, Norwalk; Steven Luzsicza, Huron, both of Ohio

[73] Assignee: The Pullman Company, Milan, Ohio

[21] Appl. No.: 761,540

[22] Filed: Dec. 6, 1996

[51] Int. Cl.⁶ .................................................. F16C 11/06
[52] U.S. Cl. ........................ 403/56; 403/133; 403/141; 403/135
[58] Field of Search .................... 403/56, 133, 135, 403/137, 141, 142, 143, 307, 46, 45, 43

[56] References Cited

U.S. PATENT DOCUMENTS

| | | | |
|---|---|---|---|
| 2,734,760 | 2/1956 | Marquis et al. | 403/56 |
| 3,053,552 | 9/1962 | Homey | 403/46 X |
| 3,408,124 | 10/1968 | Melton et al. | 403/133 X |
| 3,712,645 | 1/1973 | Herter | 285/95 |
| 3,833,309 | 9/1974 | Hobbs | 403/122 |
| 4,259,027 | 3/1981 | Hata | 403/132 |
| 4,290,181 | 9/1981 | Jackson | 29/458 |
| 4,386,869 | 6/1983 | Smith | 403/39 |
| 4,475,546 | 10/1984 | Patton | 128/92 |
| 4,695,181 | 9/1987 | Rahmede et al. | 403/133 X |
| 4,714,262 | 12/1987 | Wood | 280/95 |
| 4,778,194 | 10/1988 | Koch et al. | 403/46 X |
| 4,902,158 | 2/1990 | Broszat et al. | 403/307 X |
| 4,974,985 | 12/1990 | Glatzel | 403/133 X |
| 4,995,755 | 2/1991 | Hyodo et al. | 403/133 |
| 5,066,159 | 11/1991 | Urbach | 403/134 |
| 5,165,306 | 11/1992 | Hellon | 403/133 X |
| 5,188,476 | 2/1993 | Mori | 403/133 |
| 5,282,396 | 2/1994 | Crandall | 403/133 X |
| 5,603,583 | 2/1997 | Jackson | 403/46 X |
| 5,609,433 | 3/1997 | Pazdirek et al. | 403/140 |
| 5,613,792 | 3/1997 | Terada et al. | 403/133 X |
| 5,615,967 | 4/1997 | Hellon | 403/56 X |
| 5,630,672 | 5/1997 | McHale | 403/133 X |
| 5,641,235 | 6/1997 | Maughan et al. | 403/133 |

*Primary Examiner*—Daniel P. Stodola
*Assistant Examiner*—Bruce A. Lev
*Attorney, Agent, or Firm*—Harness, Dickey & Pierce, PLC

[57] ABSTRACT

An internally sealed pivotal joint assembly for use on buses and other vehicles. The assembly includes an eyelet which has disposed therein a bearing socket for positioning a ball stud journal therein. The assembly includes a cap and a sealing ring provided to the socket in order to avoid ingestion of contaminants and obviate the need for repeated lubrication of the assembly.

25 Claims, 8 Drawing Sheets

INTERNALLY SEALED PIVOTAL JOINT ASSEMBLY

BACKGROUND OF THE INVENTION

This invention relates to an internally sealed pivotal joint for link assemblies used in connection with, for example, sway bars or steering links for vehicles and for torque rods. The invention includes an assembly having an eyelet into which a bearing socket with an internal seal is disposed. A ball stud journal is positioned within the bearing socket to form the assembly. Such internal seals are protected from external physical damage and could be an integral part or a separate component of the bearing socket. The assembly is capped to avoid ingestion of contaminants into the assembly.

While the invention is particularly directed to the art of corrosion repellant, lubricated-for-life pivotal joints and link assemblies for vehicles, and will thus be described with specific references thereto, it will be appreciated that the invention may have usefulness in other fields and applications.

Figure 15:
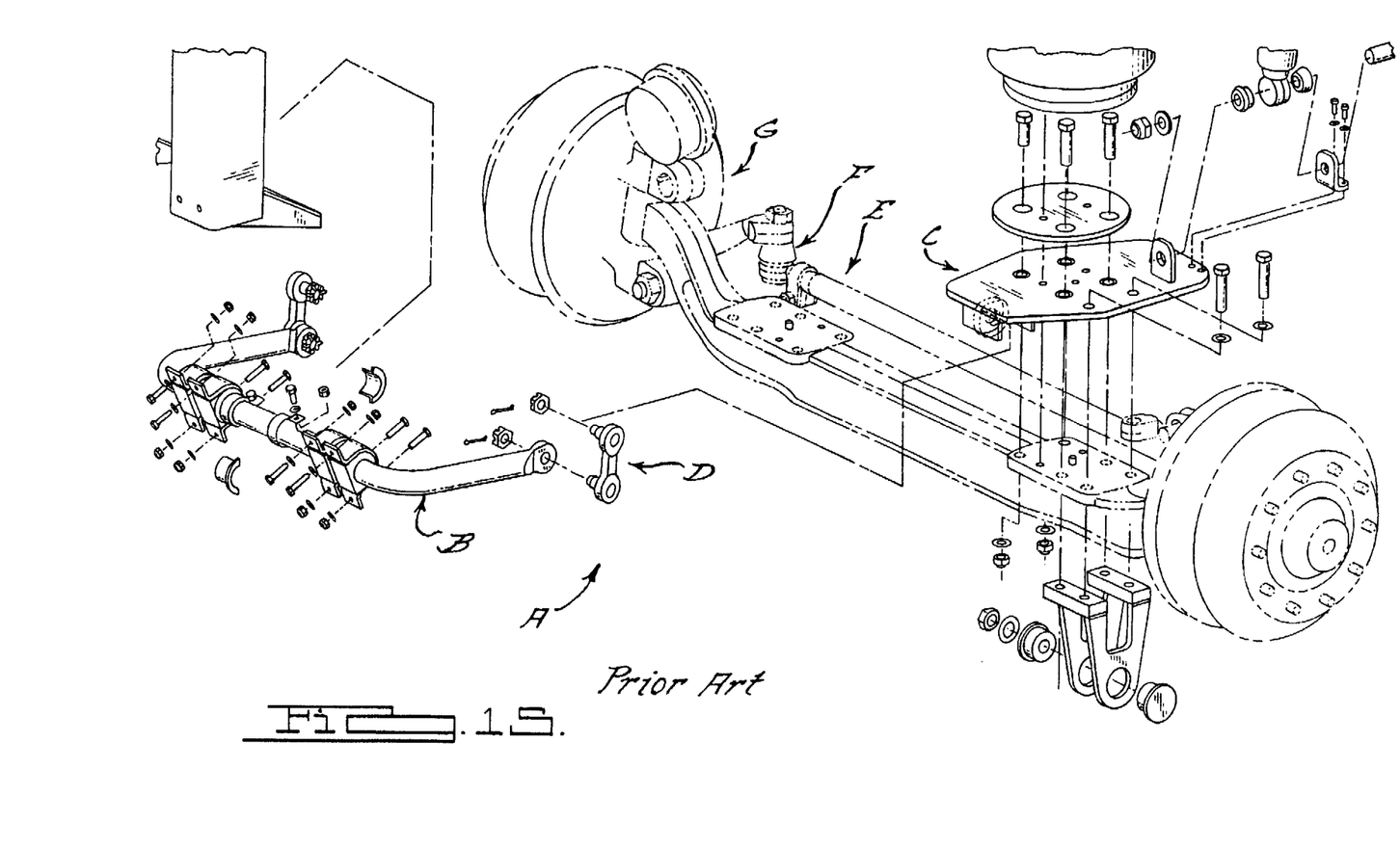
FIG. 15 is a partial exploded view of an exemplary bus front suspension.

Briefly, with exemplary reference to FIG. 15, buses —while having a variety of configurations—typically have a front suspension A which includes, among other things, a sway bar B and a frame C. Conventionally, a link D is used to connect the sway bar B and the frame C. However, this pivotal joint design allows for collection of contaminants in the link D because the pivotal joints in link D are not sealed, causing premature field failures. The link D also requires periodic reapplication of lubricant. In addition, high slip torque between bearing surfaces will generate internal heat and shorten the life of the joint.

The front suspension of buses also typically includes a steering link E having connected thereto a ball stud assembly F which is connected to a spindle assembly G. This type of connection, having an exterior sliding umbrella seal, provides limited protection. Furthermore, it is exposed to external elements and prone to impact induced cuts from stones and the like, thus preventing an efficient and reliable operation thereof.

There are more sophisticated exterior boot type seals used in the industry that consist of several components and require a complex manufacturing process; however such seals provide no protection from exterior physical damage. For example, these designs are prone to exterior damage e.g. impact damage. In addition, boot type seals are prone to flex fatigue induced cracks and wear failures. It should be noted that vehicle chassis environmental conditions are extremely hostile. Consequently, the seal is an important component of any pivotal joint subject to this environment. The performance of the seal affects the function and reliability of the pivotal joint, and therefore, the function and reliability of the linkage system, e.g. steering, suspension, etc.

Moreover, with exemplary reference to FIG. 16, conventional torque rods have a main portion M and end portions N. The end portions typically comprise an eyelet P having disposed therein a bushing Q surrounding a connection pin R. In some cases, the torque rod is not even provided with a bushing so that the connection of the rod to another assembly is essentially rigid. In addition, although only a single torque rod is shown, it is well known that such devices can be used in connection with other rods in various configurations such as the "V" rod assembly shown in FIG. 14. It would be advantageous to have a torque rod with internally sealed end portions to prevent contaminants from adversely affecting the connection of the rod to other assemblies.

The present invention contemplates a new and improved pivotal joint and assembly which resolves the above-referenced difficulties and provides other significant improvements desired in industry that are not available in current state of the art devices such as, without limitation, noise and vibration damping, corrosion repellency, lubrication-for-life and torque tunability.

SUMMARY OF THE INVENTION

A principal object of the present invention is to provide an improved, internally sealed, corrosion repellant, lubricated-for-life pivotal joint for a wide range of linkage applications used in automotive, truck, and bus chassis linkages and other industrial applications.

In accordance with one aspect of the present invention, a pivotal joint assembly having at least one eyelet having an aperture extending therethrough is provided. A bearing socket is disposed in the eyelet and a ball stud journal is disposed in the socket. In addition, a cap is positioned in an end of the aperture to secure the socket and the ball stud journal in the eyelet.

In accordance with another aspect of the present invention, the ball stud journal comprises a metallic ball stud having plastic or other suitable corrosion resistant bearing material molded around a ball end thereof.

In accordance with another aspect of the present invention, the bearing socket is made from internally lubricated elastomeric plastic material.

In accordance with another aspect of the present invention, an elastomeric bearing socket having an integrally molded annular seal compression relief groove adjacent a seal ring is provided.

In accordance with another aspect of the present invention, the bearing socket is formed of elastomers or plastics not containing internally compounded lubricants.

In accordance with another aspect of the present invention, the bearing socket has a generally spherical inner surface with lubricant reservoirs formed therein.

In accordance with another aspect of the present invention, the elastomeric or plastic bearing socket has an integrally molded internal seal.

In accordance with another aspect of the present invention, the elastomeric or plastic bearing socket has an internal annular groove to accept a seal ring component.

In accordance with another aspect of the present invention, the bearing socket assembly has a separate internal annular seal ring component.

In accordance with another aspect of the present invention, the bearing socket has internal integral or separate component seals protected from external physical impacts.

In accordance with another aspect of the present invention, the elastomeric or plastic bearing socket is split (or has two halves) and has integral or separate internal seal components.

In accordance with another aspect of the present invention, a stud end of the ball stud journal is threaded.

In accordance with another aspect of the present invention, a thread protector is provided to the stud end to protect threads thereon.

In accordance with another aspect of the present invention, silicone or another suitable lubricant is provided to the bearing socket to provide a lubricating film between the bearing socket (that is not internally lubricated) and the ball stud journal reducing friction between sliding elements.

An advantage of the present invention is that the link assembly is sealed internally to prevent contaminant ingestion and to retain the lubricant.

Another advantage of the present invention is that the elastomeric bearing socket provides torque tunability by varying wall compression and/or journal and/or socket materials.

Another advantage of the present invention is that it provides significant road impact, noise and vibration isolation.

Another advantage of the present invention is that both bearing elements are made from contaminant repellant, corrosion resistant material.

Another advantage of the present invention is that the bearing socket is lubricated to provide for continual supply of lubricant upon demand, unless the lubricant is compounded in the bearing socket material itself.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will be become apparent to those skilled in the art.

DESCRIPTIONS OF THE DRAWINGS

The present invention exists in the construction, arrangement, and combination of the various configurations and parts of the device, whereby the objects contemplated are attained as hereinafter more fully set forth, specifically pointed out in the claims, and illustrated in the accompanying drawings in which:

FIGS 13 (a)–(b) show a torque rod incorporating the link assembly of FIG. 12.

FIG. 14 (a) and (b) show a torque rod assembly incorporating assembly of FIG. 12.

FIG. 16 is an illustration of a conventional torque rod.

DETAILED DESCRIPTION OF THE PREFERRED EMBODIMENT

Figure 1:
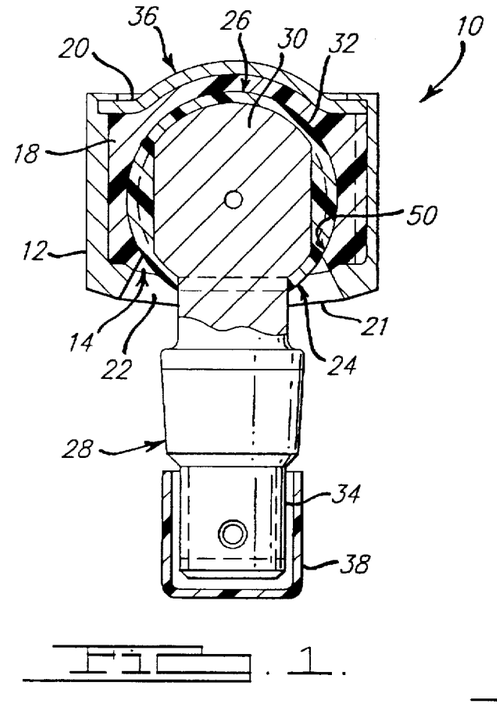
FIG. 1 is a cross-sectional view of the pivotal joint assembly according to the present invention.

Referring now to the drawings wherein the showings are for purposes of illustrating the preferred embodiments of the invention only and not for purposes of limiting same. FIG. 1 provides a view of a preferred embodiment. As shown, the joint assembly 10 has an eyelet 12. The eyelet 12 has an aperture 14. An elastomer bearing socket 18 is positioned within the aperture 14 and has a closed end proximate to a first end 20 of the aperture 14 and an open end proximate to a second end 22 of the aperture 14.

Also shown is a ball stud journal 24 having a ball end 26 and stud end 28. The ball end 26 preferably comprises a metal ball portion 30 having plastic 32 or other compatible (with bearing socket) corrosion resistant bearing material coating. It is recognized that suitable, alternative materials other than plastic may be used. The stud end 28, preferably formed of metal, includes a threaded portion 34.

A metal cap 36 is positioned in the first end of the eyelet 12 in order to secure the bearing socket 18 and ball stud journal 24 in the eyelet 12. The cap 36, which is secured to the eyelet by known techniques, also provides sealing for the assembly to avoid ingestion of contaminants therein.

Plastic thread protectors 38 are provided to the threaded portion 34. The thread protectors 38 are particularly useful during transportation and shipping of the link assemblies. Ultimately the threaded portion is used to secure the link assembly to various other assemblies such as a sway bar and a frame.

The eyelet 12 is preferably formed of metal, although other suitable materials of sufficient strength may be used. The eyelet 12 facilitates bearing socket and ball stud subassembly insertion into the aperture 14 from the first end 20 and has a bearing socket seat 21 at the second end 22. The bearing socket seat 21 prevents socket and/or ball stud disengagement through the aperture opening.

The socket 18 is preferably formed of polyurethane processed by injection molding or other suitable process to achieve maximum performance but any appropriate, compatible (with journal), corrosion resistant bearing material will suffice.

Figure 2:
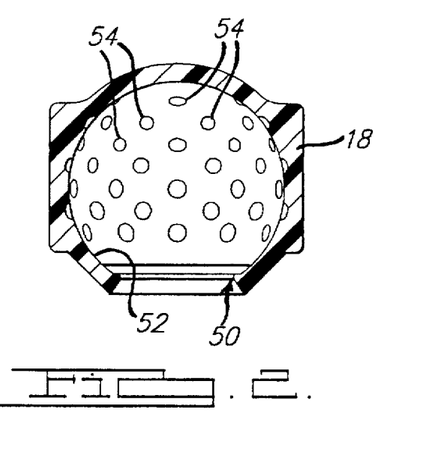
FIG. 2 is a cross-sectional view of an elastomeric bearing socket according to the present invention.

Referring now to FIG. 2, the bearing socket 18 has an integral annular ring projection 50 disposed around its open end. The ring projection 50 is compressed against the spherical portion of the journal 24 and provides for sealing when the ball stud journal is positioned therein. The sealing ring 50 prevents ingestion of contaminants and seals lubricant within the assembly.

In addition, the bearing socket 18 has a generally spherical inner contour 52 having lubricant reservoirs that are exemplary shown as dimples at 54 formed thereon. The dimples or other cavity configurations—such as a waffle pattern or annular grooves—provide a plurality of lubricant reservoirs to facilitate continuous supply of lubricant onto the sliding surfaces between the ball stud journal 24 and the bearing socket 18 facilitating prolonged product performance. Preferably, a silicone based or other suitable bearing lubricant is used for this purpose. However, the bearing socket also could be made from engineered low coefficient friction, abrasion resistant elastomeric or plastic material containing lubricant within, compounded into the material.

Figure 3:
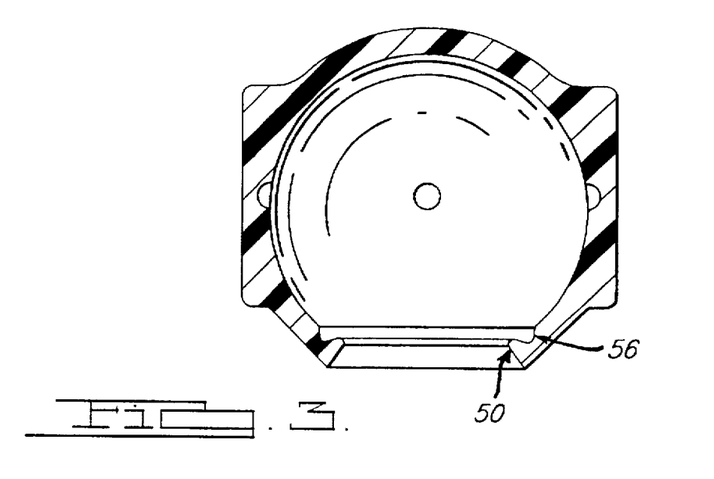
FIG. 3 is a cross-sectional view of an alternative elastomeric bearing socket according to the present invention.

FIG. 3 illustrates a further embodiment of the invention utilizing a different integral seal ring design. In this regard, a stress relief groove 56 is formed adjacent the annular seal ring 50. This groove facilitates increased seal ring compression capability, preventing excessive stress imposed on the seal ring 50. The increased seal compression in turn will assure appropriate seal function at higher bearing socket deflections generated by external operational loads exerted on the linkage. In addition, the groove 56 provides reduced stress on the seal ring 50 when assembled and better material distribution—a part of the seal ring is displaced in the groove and another part of the ring is displaced toward the end 22.

Figure 4:
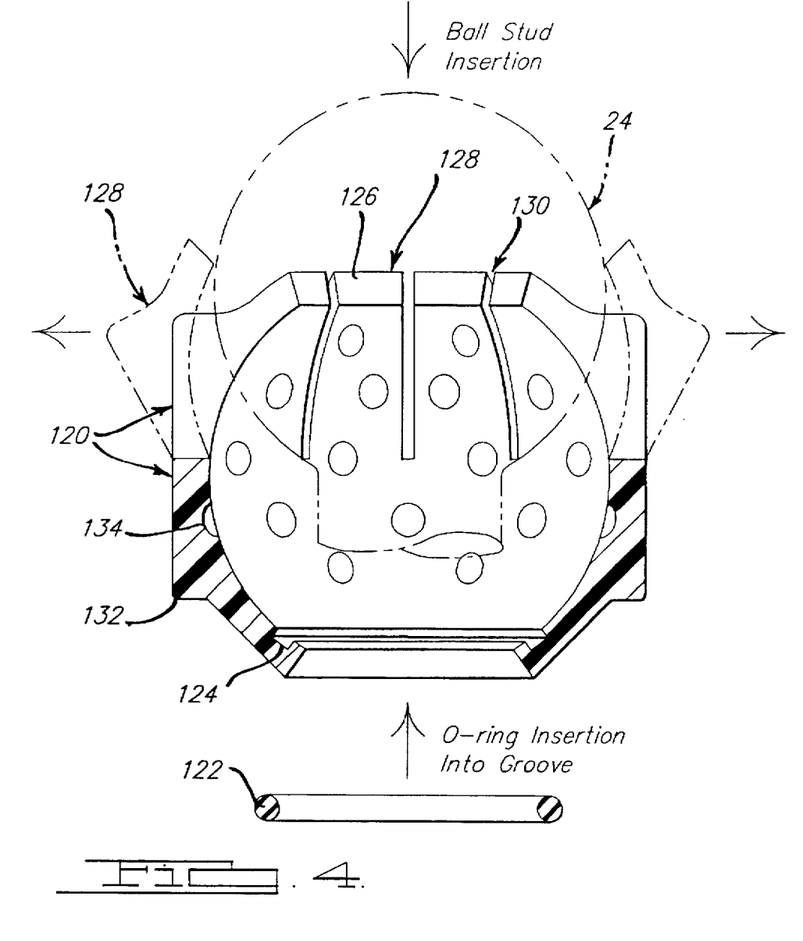
FIG. 4 is a cross-sectional view of an alternative plastic bearing socket according to the present invention.
Figure 5:
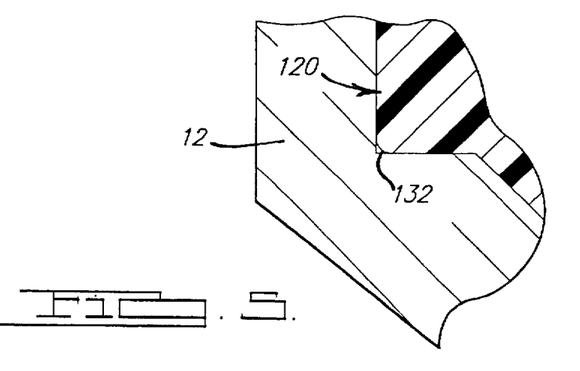
FIG. 5 is a partial cross-sectional view of the plastic bearing socket of FIGS. 4 and 6 and an eyelet according to the present invention.
Figure 6:
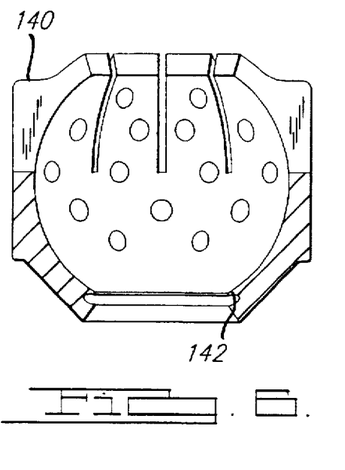
FIG. 6 is a cross-sectional view of an alternative plastic bearing socket according to the present invention.

Referring now to FIGS. 4, 5, and 6, in alternative embodiments of the invention, the bearing socket is formed of a more rigid compatible plastic. This bearing construction is desirable for higher load applications.

FIG. 4 illustrates the cross sectional view of a bearing socket 120 made from more rigid, compatible plastic bearing material. This particular configuration is sealed by a separate seal component, an O-ring, 122 to be inserted into corresponding groove 124 prior to the insertion of the ball stud journal. The separate seal component is preferably an O-ring but other suitable seal components that are preferably made from compatible elastomeric material could be used. The seal ring fits snugly in the corresponding seal groove and in assembly it is secured in place by the pressure exerted by the spherical portion of the ball stud journal. The combination of the ring 122 and the groove 124 allows sufficient sealing compression in an assembled condition. It is to be appreciated that this separate seal and groove concept is also applicable to the other socket configurations disclosed herein.

In addition, a flexible opening 126, opposite the seal ring, is provided to the socket 120 and facilitates insertion of a larger diameter ball stud through a smaller diameter socket opening. The diameter of the socket opening 126 is sized to secure the ball within the socket when assembled and to provide maximum bearing area, thus keeping the stress level in acceptable range. The diametrical expansion of the opening 126 is provided by segmentation of the bearing socket, allowing flexing of individual segments 128 during the assembly process. The segments 128 are separated from one another by slots 130 which extend through the socket 120 from the opening 126 through approximately one-half the overall height of the socket, as shown. When the ball stud is inserted in the socket 120, the segments 128 are flexed radially outwardly so that the diameter of the opening 126 is expanded to a dimension sufficient to facilitate insertion of the ball stud therein. Once the ball stud is inserted into the socket and subsequently into the eyelet, the segments 128 are moved radially inwardly to a position that prevents the ball stud from being removed from the socket 120.

Also shown in FIG. 4 are an edge seal 132 that is provided around the bottom circumference of the socket 120 to provide further sealing to the assembly (e.g. external socket sealing to prevent ingestion of contaminants between the socket and the eyelet) and a circumferential lube reservoir 134. The edge seal 132 is particularly effective when the inside corner of the eyelet is radiused, as shown in FIG. 5. The lube reservoir provides improved lubrication for the assembly. It is to be appreciated that these features of the socket 120 are equally applicable to all other embodiments of the socket illustrated herein.

With reference to FIG. 6, a socket 140 similar to the socket 120 of FIG. 4 is shown. However, the socket 140 has formed therein an integrally molded lip 142. This lip is an alternative to the seal and groove arrangement of FIG. 4. Accordingly, when the ball stud is inserted in the socket 140, the ball end engages the lip 142 to provide a seal.

Figure 7:
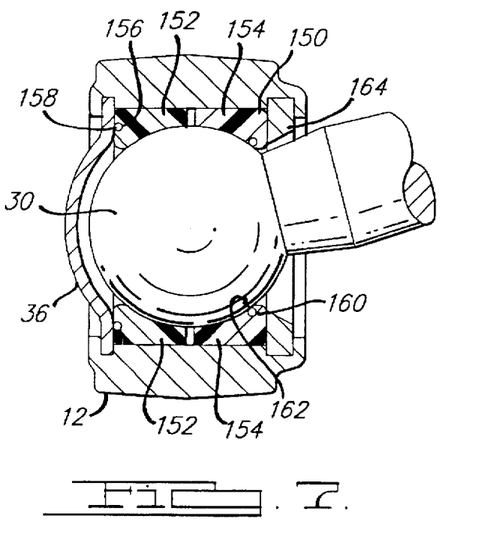
FIG. 7 is a cross-sectional view of an alternative bearing socket according to the present invention.

Still another embodiment of the present invention is illustrated in FIG. 7. As shown, a bearing socket 150 has two half bearing segments 152 and 154, thus circumventing the need for bearing socket segmentation as described in connection with FIGS. 4 and 6. The segment 152 is provided with a groove 156 and an elastomeric bearing compression ring 158 housed therein to bear against the metal cap 36. The segment 154 is similarly provided with a groove 160 and internal, annular seal ring 162 housed therein to provide sealing to prevent ingestion of contaminants. The ring 162 bears against a retention washer 164 that replaces the bearing seat 21, as shown for example in FIG. 1. It is to be recognized that an integrally formed sealing lip, or ring, could alternatively be provided to replace the seal and groove arrangement shown in connection with segment 154.

Figure 8:
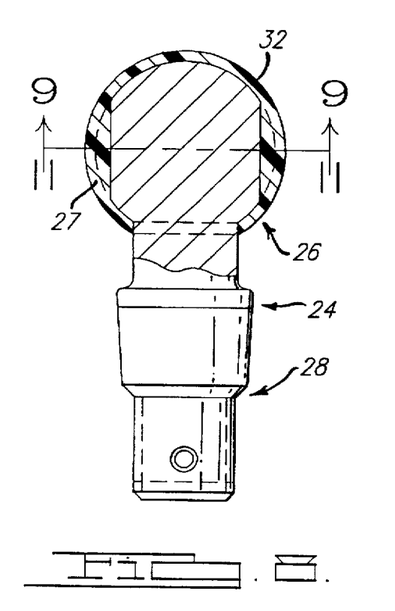
FIG. 8 is a cross-sectional view of a ball stud journal according to the present invention.
Figure 9:
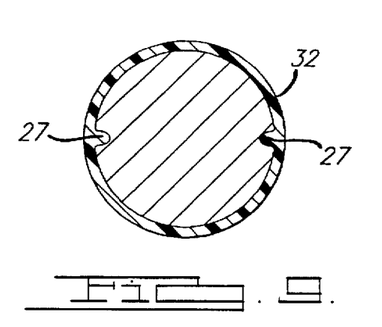
FIG. 9 is a cross-sectional view along line 9—9 of FIG. 8.

FIGS. 8 and 9 illustrate the ball stud journal 24, preferably made from metal or other high strength material. The semi-spherical portion, or ball end, 26 is coated with high finish, corrosion repellant compatible plastic or like bearing material 32. The ball end surface configuration has grooves 27 that receive the plastic coating to facilitate bonding and locking between the plastic 32 and the ball end 26. It is to be appreciated that various surface configurations could be implemented to achieve such bonding and locking. Chemical adhesion material could also be used to facilitate bonding and locking between the two elements. Instead of or in addition to a plastic coating, surface protection of the spherical ball end could also be achieved through electrolytic or electroless plating of suitable corrosion resistant bearing materials, e.g. hard NI, chrome etc.

Figure 10:
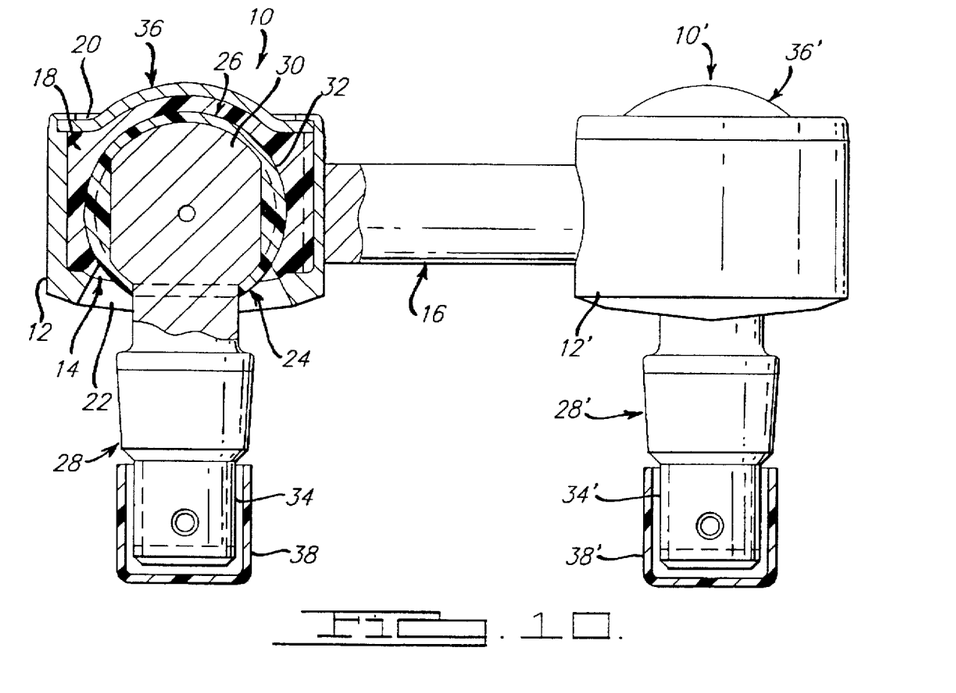
FIG. 10 is a partial cross-sectional view of a link assembly of the present invention.

A variety of uses of the assembly 10 are contemplated but a typical application is shown in FIG. 10. As illustrated, the assembly 10 is connected to an identical assembly 10' by a link, or bar, 16. This configuration is then useful to replace the link D shown in FIG. 15. It should be noted that identical elements are hereinafter identified by primed numerals.

Figure 11:
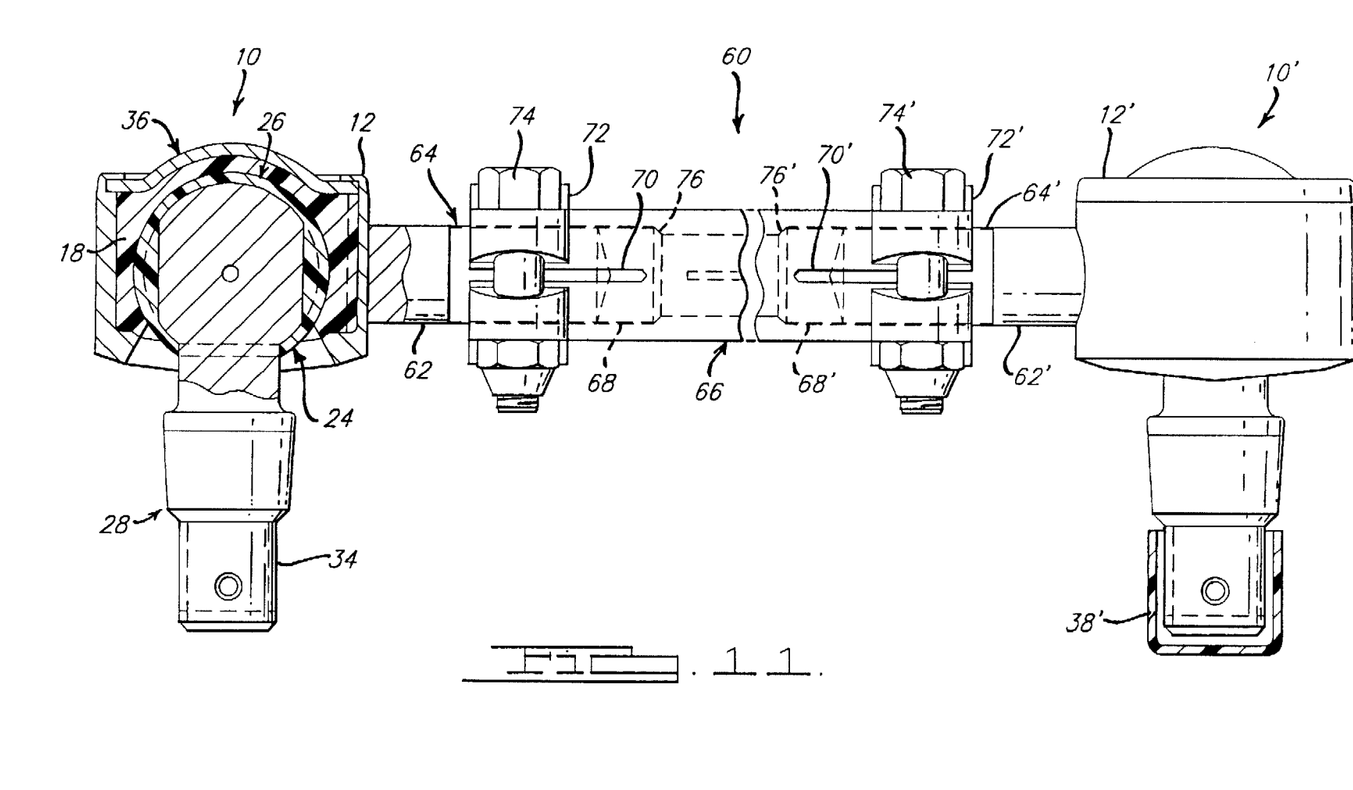
FIG. 11 shows an alternative embodiment for a link assembly according to the present invention.
Figure 12:
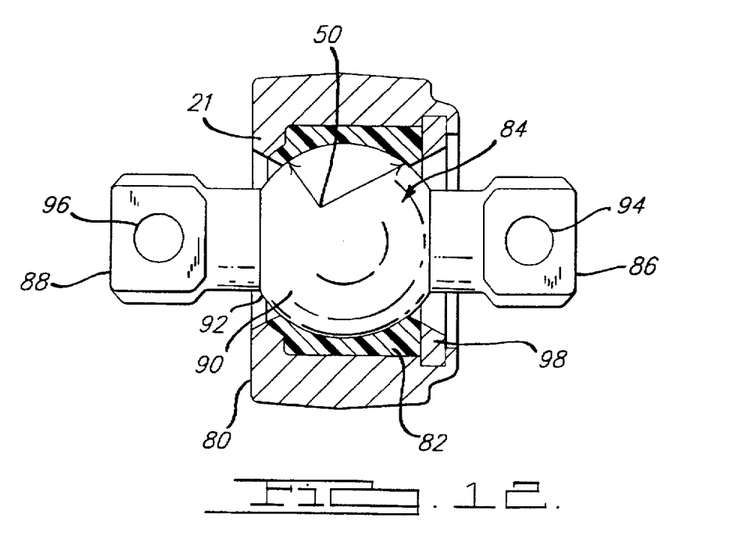
FIG. 12 shows a still further alternative embodiment for an assembly according to the present invention.

FIG. 11 illustrates a still further alternative embodiment of the present invention. More particularly, an adjustment assembly 60 may be provided in place of the bar 16 shown in FIG. 10. In this case, a link arm 62 (62') extends from eyelet 12 (12'). A threaded portion 64 is provided to the link arm 62. A sleeve 66 receives the threaded portion 64 in threaded receiving portion 68. A recess, or cut-out, 70 is formed in the sleeve 66 along the threaded receiving portion 68 to facilitate clamping of the sleeve 66 by clamp 72 so that once the sleeve 66 is threaded onto the link arm 62, the link arm 62 can be locked in place relative to the sleeve 66. The clamp 72 can be any conventional C-clamp or the like. In the preferred embodiment, clamping and/or tightening is accomplished through manipulation of bolt 74. Also illustrated in FIG. 12 is a stop surface 76 which prevents the link arm 62 from being threaded beyond a predetermined point within the sleeve 66. Accordingly, the spacing between the eyelets may be selectively adjusted by threadably advancing or retracting the link arms in the sleeve. It is to be appreciated that this embodiment of the invention is useful to replace the ball stud assembly F of FIG. 15.

FIG. 12 illustrates a still further alternative embodiment of the present invention. More particularly, an eyelet 80 has disposed therein a bearing socket 82. The bearing socket 82 is similar to the bearing socket 18 (e.g. has internal integral annular seal rings 50 and dimples 54 on inner surface 52) but, unlike the bearing socket 18, has two opposed open ends (each having provided thereto a ring 50). A ball portion 84 from which stud portions 86 and 88 extend is disposed in the bearing socket 82. The ball portion 84 comprises a metal ball 90 having plastic (or other plating material such as hard chrome) 92 molded therearound. The stud portions 86 and 88 have apertures 94 and 96 respectfully formed therein to facilitate subsequent connection of the assembly to a vehicle frame or other support.

Figure 13A:
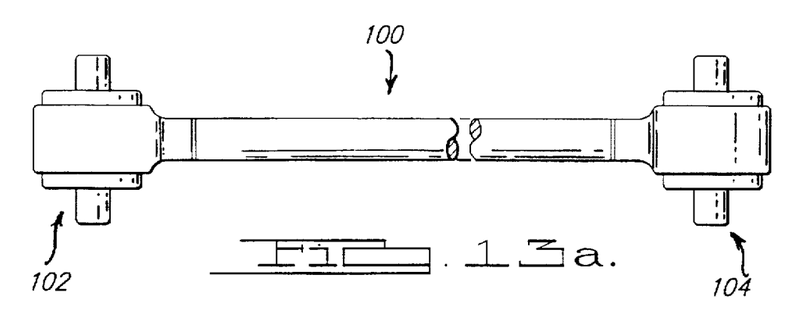
Figure 13B:
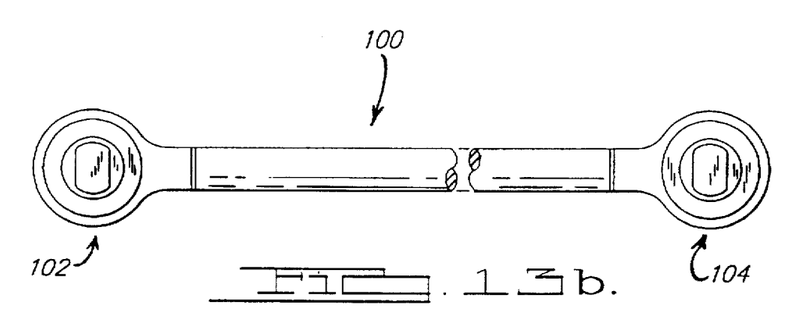

Also shown is a retention washer 98 which essentially replaces the metal cap 36 of the assembly shown in FIG. 1. The socket seat 21 is provided to an end opposite to the end into which the washer 98 is placed. It will be appreciated that the ball stud journal and socket assembly are positioned within the eyelet 80 and seated against the seat 21 before the washer 98 is installed. Placement of the washer 98 in the position shown secures the ball stud journal and socket into an assembled position. In addition, as with all socket configurations disclosed herein, the integral internal annular seal rings are interchangeable with a seal ring and groove arrangement. The embodiment shown in FIG. 12 finds use with a conventional torque rod 100, for example, shown in FIGS. 13(a) and (b), as well as a torque rod such as that shown in FIG. 16. The assembly replaces the conventional connecting means used for torque rods on ends 102 and 104.

Figure 14A:
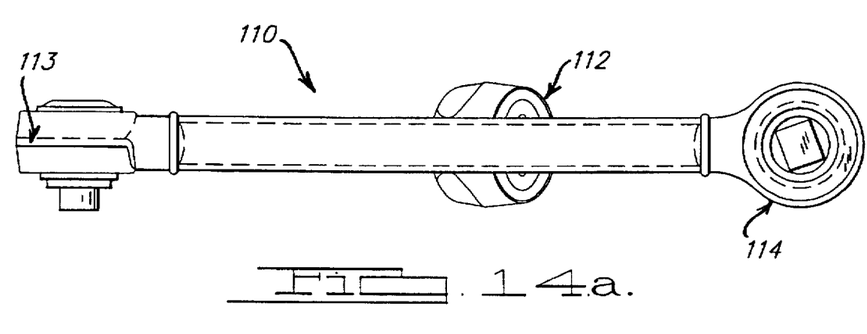
Figure 14B:
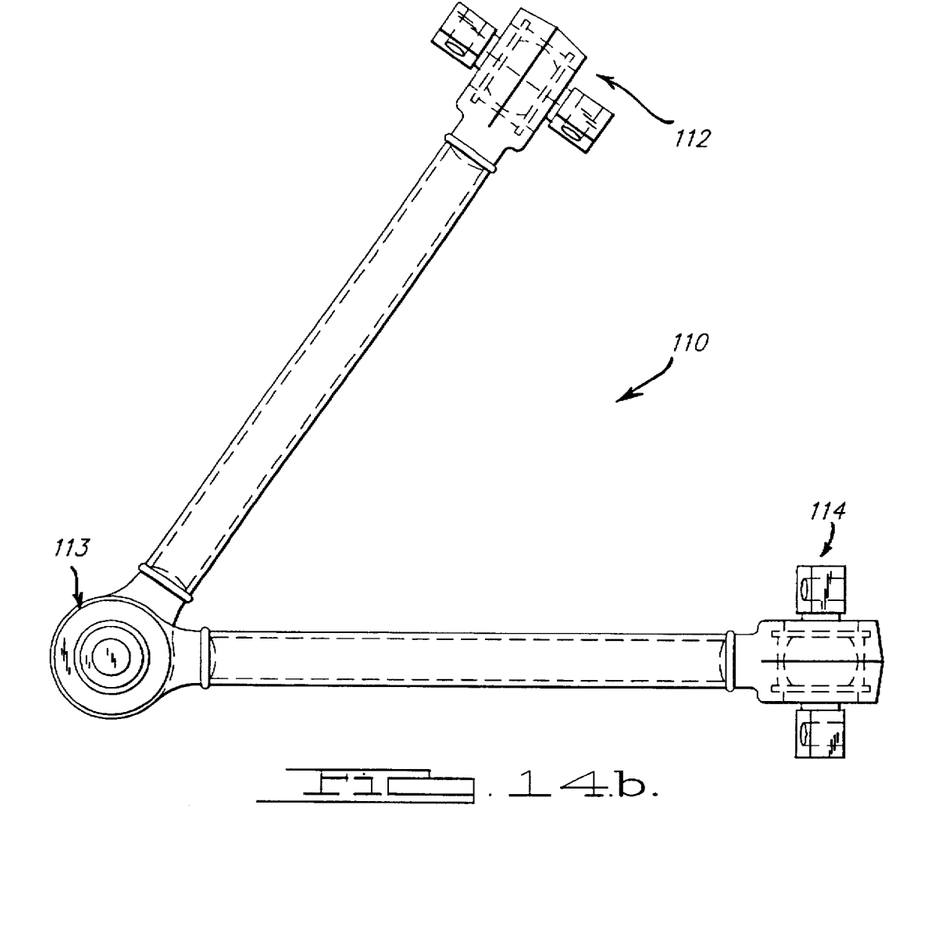

As a further example, a known link assembly 110, shown in FIGS. 14(a) and (b), utilizes the assembly to replace conventional connecting means at terminal ends 112 and 114 and apex end 113.

The above description merely provides a disclosure of particular embodiments of the invention and is not intended for the purpose of limiting the same thereto. As such, the invention is not limited to only the above described embodiments. Rather, it is recognized that one skilled in the art could conceive alternative embodiments that fall within the scope of invention.

Having thus described the invention, we claim:

1. An assembly comprising:
   a link including a first eyelet having a first aperture extending therethrough and a second eyelet having a second aperture extending therethrough;
   a first bearing socket having a first generally spherical inner contour disposed in the first eyelet, the first spherical inner contour being continuous and closed at a first end of the first aperture, the first spherical inner contour having an opening defined by an internal annular seal ring proximate to a second end of the first aperture;
   a first plurality of dimples positioned on the first spherical inner;
   a first ball journal having a ball end thereof disposed in the first socket in sliding contact with the first spherical inner contour, the first ball journal having a first stud end thereof extending through the opening of the first socket and the second end of the first aperture, the first stud end being capable of conical movement with respect to the first eyelet due to the sliding contact between the first ball journal and the first spherical inner contour of the first socket;
   a first cap positioned in the first end of the first aperture to secure and seal the first socket and the first ball journal in the first eyelet;
   a second bearing socket having a second generally spherical inner contour disposed in the second eyelet, the second spherical inner contour being continuous and closed at a first end of the second aperture the second spherical inner contour having an opening defined by an internal annular seal ring proximate to a second end of the second aperture;
   a second plurality of dimples positioned on the second spherical inner,
   a second ball journal having a ball end thereof disposed in the second socket in sliding contact with the second spherical inner contour, the second ball journal having a second stud end thereof extending through the opening of the second socket and the second end of the second aperture, the second stud end being capable of conical movement with respect to the second eyelet due to the sliding contact between the second ball journal and the second spherical inner contour of the second socket; and,
   a second cap positioned in the first end of the second aperture to secure and seal the second socket and the second ball journal in the second eyelet.

2. The assembly as set forth in claim 1 further comprising a bar connected between the first and second eyelets.

3. The assembly as set forth in claim 1 further comprising an adjustment assembly connected between the first and second eyelets, the adjustment assembly comprising threaded end portions extending from the first and second eyelets that are received in a threaded sleeve whereby a length of the link is adjustable.

4. The assembly as set forth in claim 1 wherein the first and second ball journals each comprise a metallic ball stud having a plastic molded ball around the ball end thereof, the ball end defining a groove and the plastic ball defining a tab disposed within the groove to Prohibit movement of the plastic ball with respect to the metal ball stud.

5. The assembly as set forth in claim 1 wherein the first and second bearing sockets are formed of polyurethane.

6. The assembly as set forth in claim 1 further comprising lubricant provided to the first and second bearing sockets to provide a film between the first and second bearing sockets and the first and second ball stud journals, respectively, to reduce friction therebetween.

7. The assembly as set forth in claim 1 wherein the annular seal rings are integral to the socket.

8. The assembly as set forth in claim 7 further comprising relief grooves adjacent the integral seal rings.

9. The assembly as set forth in claim 1 wherein the annular seal rings and the sockets are separate components.

10. An assembly comprising:
    a link including an eyelet having an aperture extending therethrough;
    an elastomeric bearing socket having a generally spherical inner contour disposed in the eyelet, the spherical inner contour being continuous and closed at a first end of the aperture, the spherical inner contour having an opening proximate to a second end of the aperture;
    a plurality of lubricant reservoirs positioned on said spherical inner contour;
    a ball journal having a ball end thereof disposed in the socket in sliding contact with the spherical inner contour, the ball journal having a stud end thereof extending through the opening of the socket and the second end of the aperture, the stud end being capable of conical movement with respect to the eyelet due to the sliding contact between the ball journal and the spherical inner contour of the socket; and,
    a cap positioned in the first end of the aperture to secure and seal the socket and the ball journal in the eyelet.

11. The assembly as set forth in claim 10 wherein the ball journal comprises a metallic ball stud having a plastic ball molded around the ball end thereof, the ball end defining a groove and the plastic ball defining a tab disposed within the groove to prohibit movement of the plastic ball with respect to the metallic ball stud.

12. The assembly as set forth in claim 10 wherein the lubricant reservoirs comprise dimples.

13. The assembly as set forth in claim 10 wherein the bearing socket is formed of polyurethane.

14. The assembly as set forth in claim 10 further comprising lubricant applied to the bearing socket to provide a lubricating film between the bearing socket and the ball stud journal to reduce friction between the sliding members.

15. The assembly as set forth in claim 11 wherein the the socket is provided with an integral seal ring disposed around the opening.

16. The assembly as set forth in claim 15 further comprising a relief groove adjacent the seal ring.

17. The assembly as set forth in claim 10 wherein the opening of the socket is provided with a seal ring, the seal ring being a separate component to facilitate seal precompression.

18. The assembly as set forth in claim 17 wherein the seal ring is disposed in an annular groove in the socket.

19. The assembly as set forth in claim 10 wherein the socket is made from a material that facilitates slip torque tuning by varying compression.

20. The assembly as set forth in claim 10 wherein the socket provides noise, vibration, and shock damping.

21. The assembly as set forth in claim 10 wherein the socket is made from an internally lubricated elastomer.

22. The assembly as set forth in claim 10 wherein the socket has an external annular seal element to prevent contaminants from penetrating between the eyelet and the socket.

23. The assembly as set forth in claim 10 wherein the socket comprises two halves.

24. The assembly as set forth in claim 10 wherein the ball end of the ball journal includes a surface configuration to generate a mechanical lock between the ball end and a coating thereon.

25. An assembly comprising:

a link including an eyelet at each opposing end; at least one eyelet having an aperture extending therethrough;

a bearing socket disposed in the eyelet, the socket having a first opening proximate to a first end of the aperture and a second opening proximate to a second end of the aperture, the socket having a generally spherical inner surface upon which a plurality of lubricant reservoirs are positioned; and, a ball stud journal having a ball portion thereof disposed in the socket in sliding contact with the spherical inner surface, a first stud end thereof extending through the first opening and through the first end of the aperture and a second stud end thereof extending through the second opening and through the second end of the aperture, the first and second stud ends being capable of conical movement with respect to the eyelet due to the sliding contact between the spherical inner surface and the ball portion of the ball stud journal.

\* \* \* \* \*

UNITED STATES PATENT AND TRADEMARK OFFICE
CERTIFICATE OF CORRECTION

PATENT NO. : 5,795,092
DATED : August 18, 1998
INVENTOR(S) : Kevin J. Jaworski et al It is certified that error appears in the above-identified patent and that said Letters Patent is hereby corrected as shown below:

Col. 1, line 45, delete "damage e.g." & substitute --damage, e.g.,-- therefor

Col. 3, line 62, delete "FIGS 13" & substitute --FIGS. 13-- therefor

Col. 6, line 54, delete "FIG. 12" & substitute --FIG. 11-- therefor

Col. 7, line 5, delete "respectfully" & substitute --respectively-- therefor

Col. 7, line 48, claim 1, after "inner" insert --contour--

Col. 8, line 2, claim 1, after "inner" insert --contour--

Col. 8, line 28, claim 4, delete "Prohibit" & substitute --prohibit-- therefor

Col. 8, line 44, claim 10, after "eyelet" insert --at each opposing end; at least one eyelet--

Col. 9, line 10, claim 15, delete "claim 11" & substitute --claim 10-- therefor

Col. 9, line 10, claim 15, delete 2nd occurrence of "the"

Signed and Sealed this

Twenty-seventh Day of April, 1999

Attest:

Attesting Officer

Q. TODD DICKINSON

*Acting Commissioner of Patents and Trademarks*